United States Patent [19]

Shi et al.

[11] Patent Number: 5,219,124

[45] Date of Patent: * Jun. 15, 1993

[54] MULTI-PHASE SYNCHRONOUS AUTOMATIC WINDING METHOD AND APPARATUS FOR MOTOR STATORS

[75] Inventors: Kwo-Yuan Shi; Ji-An Peng; Sheng-Long Wu; Yu-Kwang Chang, all of Hsinchu, Taiwan

[73] Assignee: Industrial Technology Research Institute, Hsinchu, Taiwan

[ * ] Notice: The portion of the term of this patent subsequent to Jun. 25, 2008 has been disclaimed.

[21] Appl. No.: 620,717

[22] Filed: Dec. 3, 1990

Related U.S. Application Data

[63] Continuation-in-part of Ser. No. 444,936, Dec. 4, 1989, Pat. No. 5,025,997.

[51] Int. Cl.⁵ .......................................... H02K 15/02
[52] U.S. Cl. .................................. 242/1.1 R; 29/596
[58] Field of Search ............ 242/1.1 R, 1.1 E, 1.1 A, 242/7.02, 7.03, 7.05 B, 7.05 C, 7.11, 7.14, 7.15; 29/596

[56] References Cited

U.S. PATENT DOCUMENTS

| | | | |
|---|---|---|---|
| 2,632,602 | 3/1953 | Weis | 242/1.1 R |
| 2,647,696 | 8/1953 | Brunand | 242/1.1 R |
| 2,949,789 | 8/1960 | Eminger | 242/1.1 R |
| 3,414,204 | 12/1968 | Friedrich | 242/1.1 R |
| 3,822,830 | 7/1974 | Peters | 242/1.1 R |
| 4,588,143 | 5/1986 | Hetzel | 242/1.1 R |
| 5,025,997 | 6/1991 | Shi et al. | 242/1.1 R |

Primary Examiner—Katherine Matecki

[57] ABSTRACT

Apparatus and method for winding for winding enamel wires into a motor stator which provides for precisely positioning motor stators to be wound, so that the scraping of the outer coating of enamel wires by the wire slots of motor stators can be avoided during winding operation of motor stators. Furthermore, the improved multi-phase synchronous winding apparatus for motor stators is capable of immediately detecting the damage of the outer coating of the enamel wires during winding operation of motor stators so as to avoid the waste of enamel wires and working times. The improved multi-phase synchronous winding apparatus for motor stators also prevents the enamel wires from disengaging by the use of a tension control device during winding operations of motor stators.

8 Claims, 8 Drawing Sheets

MULTI-PHASE SYNCHRONOUS AUTOMATIC WINDING METHOD AND APPARATUS FOR MOTOR STATORS

This application is a continuation-in-part of copending application Ser. No. 07/444,936 filed on Dec. 4, 1989 now U.S. Pat. No. 5,025,997 issued Jun. 25, 1991.

BACKGROUND OF THE INVENTION

The present invention relates generally to an improved multi-phase synchronous winding apparatus for motor stators and a method for winding the same, and particularly to an improvement to U.S. patent application Ser. No. 07/444,936 filed on Dec. 4, 1989, now U.S. Pat. No. 5,025,997 issued Jun. 25, 1991, titled "Multi-Phase Synchronous Winding Method and Apparatus for Motor Stators" which is inverted by Fuh-Chyun tang and Kwo-Yuan Shi. The latter is also one of the inventors of the present invention.

The 444,936 application provides a method and an apparatus for winding motor stators having narrow wire slots to avoid inward sliding of the wires wound in the wire slots of a motor stator.

However, the wire slots formed in the central holes of motor stators are very narrow (the width of the slot is less than 1 m.m.). If the stator to be wound is not positioned at its precise position, then the outer coating of enamel wires wound into the wire slots will be scraped away by sharp edges of the openings of the wire slots, and the performance of the motor stator will thus decrease.

Besides, it takes lots of time to complete the winding operation of a single stator, and the operator is unable to detect any damage of the outer coatings of enamel wires during the winding operation, and to halt the winding operation of the stator immediately after the happening of the damage.

As shown in FIG. 1 (same as FIG. 8 of the 444,936 application), the tension control means 10 of the 444,936 application comprises two guide rollers 11, 12 rotatably secured to the table T; an oscillating arm 13 pivotally secured to the table T; two guide rollers 14, 15 pivotally secured to the oscillating arm 13; and a tension spring 16 whose two ends are respectively fixed to the oscillating arm 13 and the table T. The enamel wire W coming out from the guide roller 14 is led to the wire carrying device 20 (see FIG. 2 same as FIG. 5 of the 444,396 application). However, the guide roller 14 is pivotally secured to the oscillating arm 13, so that the guide roller 14 will move to and fro along an arc-shaped path during the reciprocating motions of the wire carrying device 20, and the enamel wire w guided by the guide roller 14 is prone to disengage with the guide roller 14.

SUMMARY OF THE INVENTION

The primary object of the present invention is to provide an improved multi-phase synchronous winding apparatus for motor stators, which is capable of precisely positioning motor stators to be wound, so that the scraping of the outer coating of enamel wires by the wire slots of motor stators can be avoided during the winding operation of motor stators.

It is another object of the present invention to provide an improved multi-phase synchronous winding apparatus for motor stators, which is capable of immediately detecting the damage of the outer coating of the enamel wires during the winding operation of motor stators.

It is another object of the present invention to provide an improved multi-phase synchronous winding apparatus for motor stators, which is capable of preventing the enamel wires from disengaging with tension control means during the winding operation of motor stators.

It is another object of the present invention to provide an improved multi-phase synchronous winding method for motor stators, which is capable of precisely positioning motor stators to be wound, so that the scraping of the outer coating of enamel wires by the wire slots of motor stators can be avoided during winding operation of motor stators.

It is another object of the present invention to provide an improved multi-phase synchronous winding method for motor stators, which is capable of immediately detecting the damage of the outer coating of the enamel wires during the winding operation of motor stators.

It is another object of the present invention to provide an improved multi-phase synchronous winding method for motor stators, which is capable of preventing the enamel wires from disengaging with tension control means during the winding operation of motor stators.

In accordance with the present invention, an improved multi-phase synchronous winding apparatus for motor stators has a central hole, a first longitudinal end, a second longitudinal end, and a plurality of wire slots which are formed in the surface of the central hole and extended between the two longitudinal ends for receiving the wires therein. The apparatus has a first wire stopper and a second wire stopper respectively attached to the first end and the second end of a motor stator so as to stop the wires which have been wound into the wire slots of the motor stator from sliding radially inward under the action of the wires. A stator fixture for holding the motor stator has the first wire stopper and the second wire stopper attached to its two longitudinal ends; a first wire guiding member and a second wire guiding member which cover, respectively, the first end and the second end of the motor stator, and which extend longitudinally into the central hole of the motor stator, with each of the wire guiding members including a plurality of equally-spaced guiding slits, which commence from outward of an end of the motor stator, extend longitudinally along the inner surface of the central hole of the motor stator, and radially align, respectively, with the center of one of the wire slots for accurately guiding the wires into the wire slots. Rotating means is provided to rotate the stator fixture together with the motor stator, relative to the wire guiding members, through a predetermined angle as required. Wire carrying means is provided to move periodically through the central hole of the motor stator for carrying the wires to two extremities externally of the two ends of the motor stator. A plurality of pairs of first wire feeding means and second wire feeding means are provided with the number of pairs being the same as the phase number of the motor stator. The plurality of first wire feeding means is disposed externally of the first longitudinal end of the motor status in a circumferentially equally spaced manner, and the plurality of second wire feeding means is disposed externally of the second longitudinal end of the motor stator in a circumferentially equally spaced manner. Each of the first wire feeding means is adapted to catch and pull a wire and feed the wire into a guiding slits of the first wire guiding member, and each of the second wire feeding means is adapted to catch and pull a wire and feed the wire into another wire slot of the motor stator under the guidance of the guiding slits of the second wire guiding member, and a plurality of tension control means each of which is adapted to properly control the tension of a wire wound in the motor stator. The winding apparatus further comprises a stator positioning means adapted for positioning the stator held by the stator fixture to a proper position, so that the guiding slits of the first and second wire guiding members is capable of aligning exactly with the corresponding wire slots of the motor stator.

According to another aspect of this invention, the winding apparatus further comprises device for detecting damage of insulation among wires and the stator fixture during winding operations.

According to another aspect of this invention, each of the above tension control means comprises means for adjusting the tension of the wire passing therethrough, and means for guiding the wire passing therethrough to come out from said tension control means by way of an unmovable outlet.

In accordance with the present invention, a method for winding enamel wires into a multi-phase motor stator has a central hole, a first longitudinal end, a second longitudinal end, and a plurality of wire slots which are formed in the surface of the central hole and extend between the two longitudinal ends for receiving the wires therein. The method includes:

(1) attaching a first wire stopper and a second wire stopper, respectively, to the first longitudinal end and the second longitudinal end of the motor stator;

(2) holding the motor stator with a stator fixture which may be operated to precisely rotate the motor stator through a predetermined angle as required;

(3) positioning the stator held by the stator fixture to a proper angular position, and covering the first end and the second end of the motor stator, respectively, with a first wire guiding member and a second wire guiding member, each of the wire guiding members including a plurality of equally-spaced guiding slits which commence from outward of a longitudinal end of the motor stator, extending longitudinally along the inner surface of the central hole of the motor stator, and radially align, respectively, with the center of one of the wire slots for accurately guiding the wires into the wire slots, whereby the guiding slits of the first and second wire guiding members is capable of aligning exactly with the corresponding wire slots of the motor stator;

(4) mounting a plurality of wires, the same in number as that of the motor stator, into a wire carrying means capable of moving periodically through the central hole of the motor stator for carrying the wires to two extremities externally of the two ends of the motor stator, and fixing the end portion of each wire to the stator fixture;

(5) carrying the plurality of wires to the extremity externally of the first longitudinal end of the motor stator with the wire carrying means;

(6) catching and pulling each of the wires with one of a plurality of first wire feeding means and feeding each wire into a first wire slot of the motor stator under the guidance of the guiding slits of the first wire guiding member;

(7) rotating the motor status relative to the wire guiding members through a predetermined angle so as to move a second wire slot of the motor stator, which is of the same pole as the first wire slot of the motor stator, into the original location of the first wire slot, whereby winding a length of each wire onto the first wire stopper covering an angular range of the predetermined angle and stopping the wound wires from moving inward with the first wire stopper;

(8) carrying each wire outward of the second end of the motor stator with the wire carrying means and releasing the wires caught by the first wire feeding means at a proper position during the movement of the carrying means toward the second end of the motor stator under the guiding member;

(9) catching and pulling each wire with one of a plurality of second wire feeding means and feeding the wire into the second wire slot of the motor stator under the guidance of the guiding slits of the second wire guiding member;

(10) rotating the motor stator, in a direction opposite to the rotation direction of the motor stator in the step (7), through the predetermined angle so as to move the motor stator back to the original location thereof in the second wire stopper covering an angular range of the predetermined angle and stopping the wound wires from moving inward with the second wire stopper; rotating the stator 1, in a direction opposite to the rotation direction in the step

(11) carrying each the wires to the extremity externally of the first end of the motor stator with the wire carrying means and releasing the wires caught by the movement of the wire carrying means toward the first end of the motor stator;

(12) repeating the steps (6) to (11) until each wire has been wound in the first and second wire slots for predetermined turns so as to complete the winding operation of the first pole of the motor stator;

(13) rotating the motor stator to a position suitable for the winding operation of the next pole of the motor stator, and performing the winding operation according to the steps (6) to (12); and

(14) repeating the step (13) until all of the poles of the motor stator have finished winding operation, characterized in that: the method further comprises positioning the stator held by the stator fixture to a proper position, so that the guiding slits of the first and second wire guiding members is capable of aligning exactly with the corresponding wire slots of the motor stator.

According to another aspect of this invention, the method further includes a step of detecting damage of insulation among wires and the stator fixture during winding operations by a device having a sensor for detecting the existence of an electric current; an electric power source; one pair of spaced disks secured to the stator fixture, for rotating together therewith; a plurality of terminals secured to one of the disks, with the number of the terminals being the same as the phase number of the motor stator, for connecting with the wires to be wound into the wire slots of the motor stator; a plurality of sets of first electric conducts, with the number of the sets of the first electric conducts being the same as the phase number of the motor stator, disposed on the outer peripheral surfaces of the pair of spaced disks, each set of the first electric conducts being electrically connected to one of the terminals; and one pair of second electric conducts electrically insulated with each other, each of which being respectively and alternately kept in touch with one of the first electric conducts at one time when the pair of spaced disks are being rotated, one of the second electric conducts being coupled to the electric power source, the other being coupled to the sensor.

According to another aspect of this invention, the method further comprises steps of adjusting the tension of the wires and guiding the wires by way of unmovable guide members.

BRIEF DESCRIPTION OF THE DRAWINGS

The present invention can be more fully understood by referring to the following description and accompanying drawings, which form an integral part of this application.

DETAILED DESCRIPTION OF THE PREFERRED EMBODIMENTS

Figure 1:
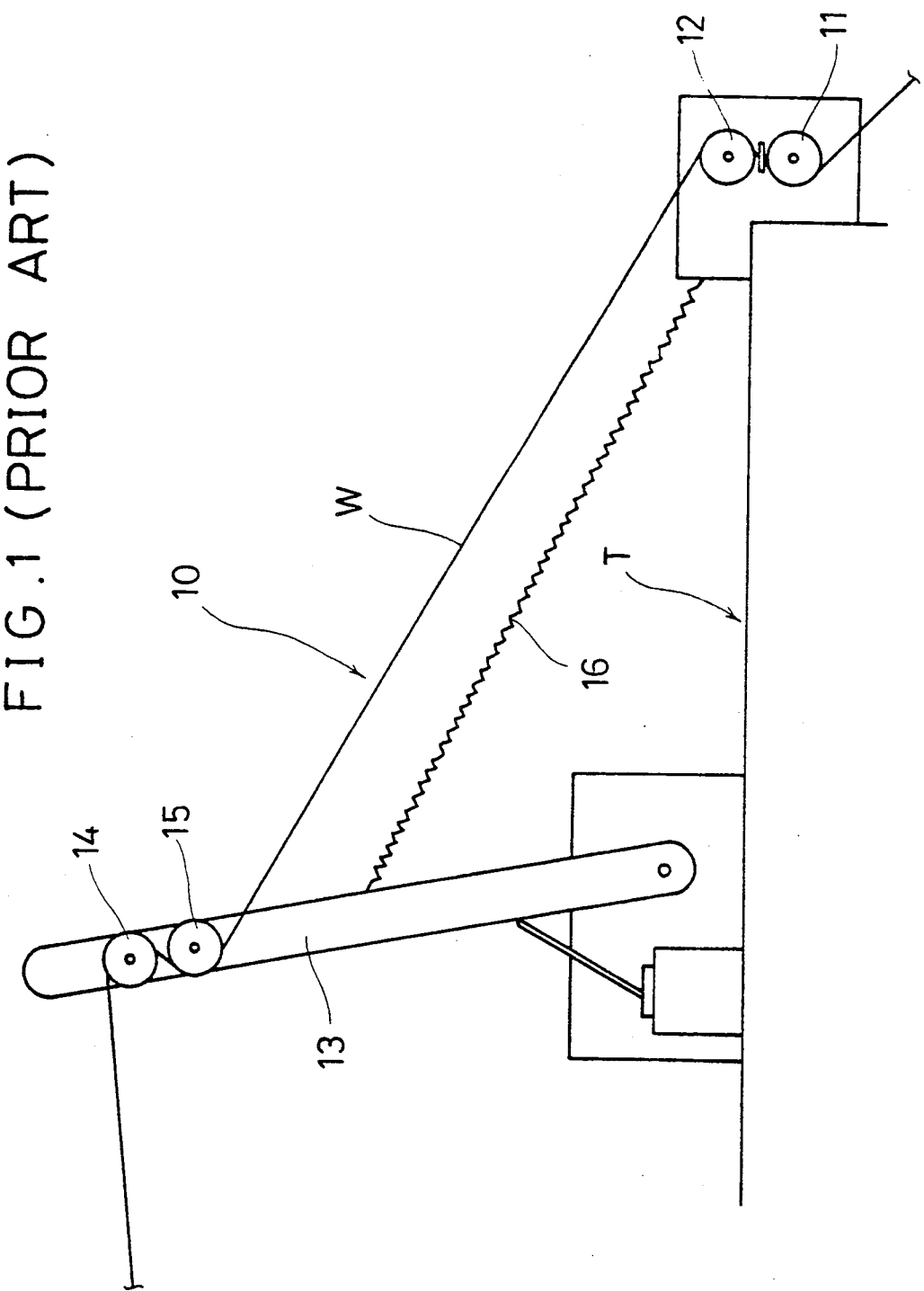
FIG. 1 is a simplified diagram showing the construction of the tension control means disclosed by the 444,936 application (prior art)
Figure 2:
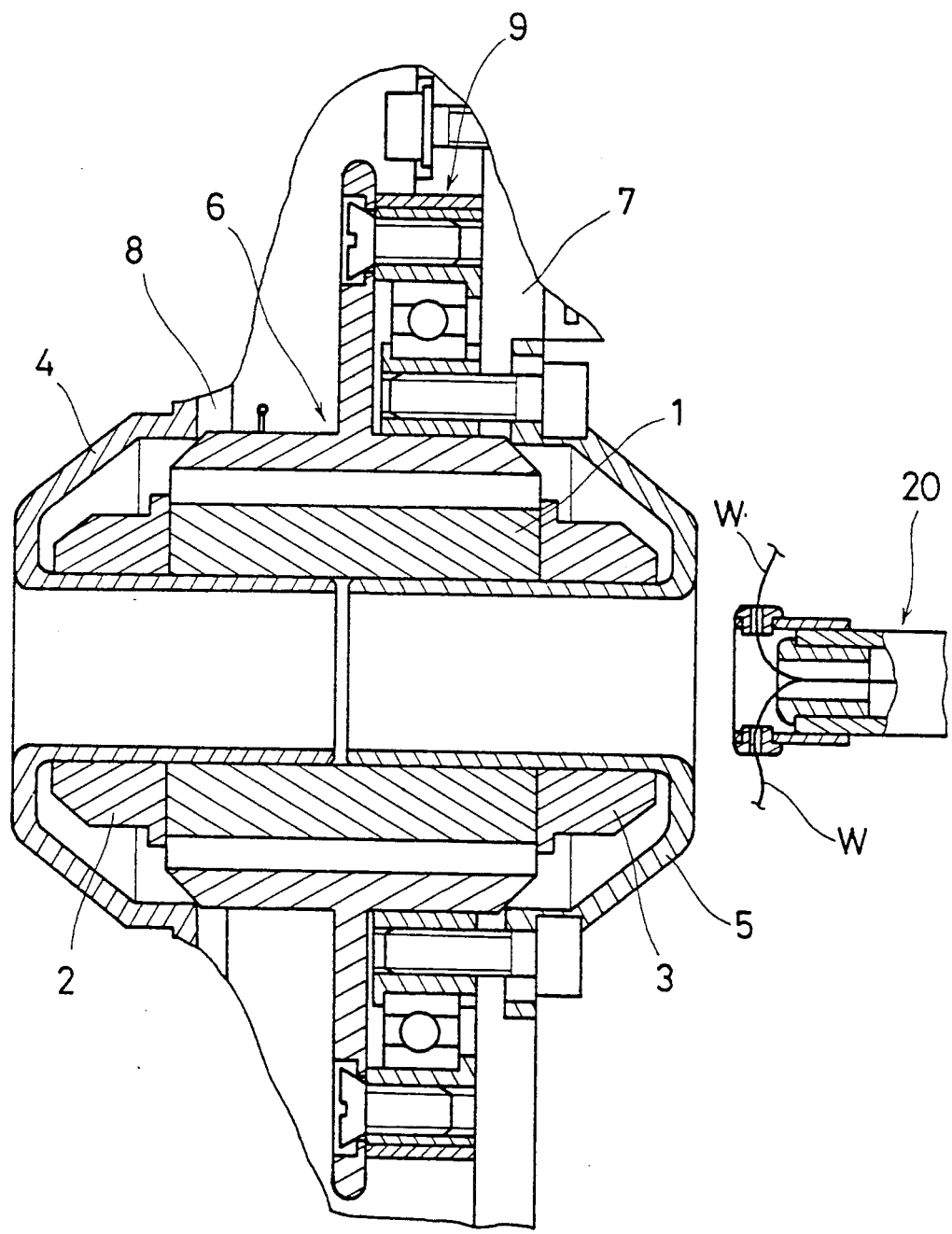
FIG. 2 is an enlarged fragmentary view showing the portion in the vicinity of the motor stator to be wound disclosed by the 444,936 application.
Figure 3:
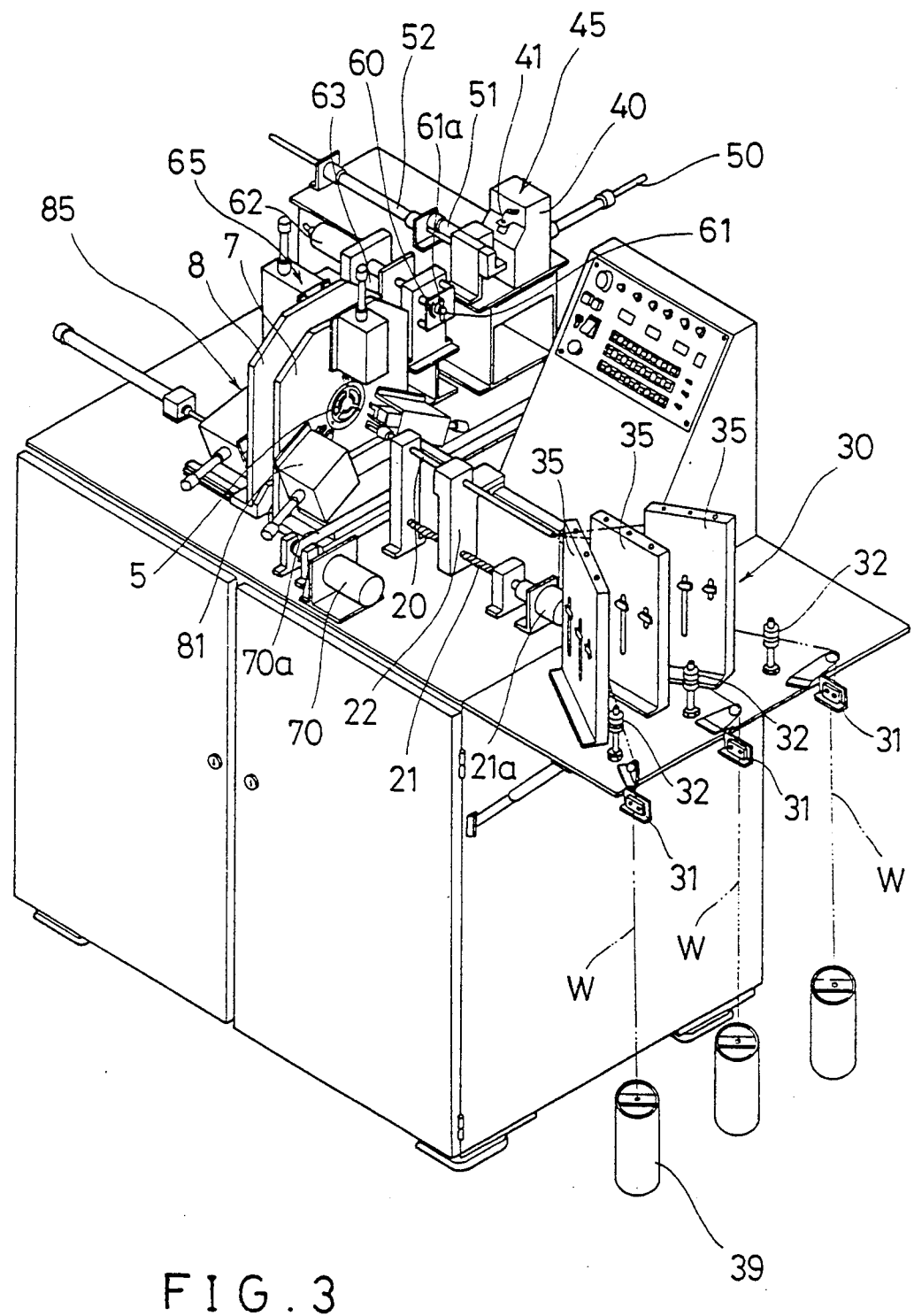
FIG. 3 is an overall perspective view showing the construction of an embodiment of the winding apparatus according to this invention.

As shown in FIG. 3, the winding apparatus according to this invention comprises a stator supply mechanism 45, a stator position mechanism 65, a stator wind mechanism 85, and a wire tension control device 30. The stator supply mechanism 45 comprises a stator storage 40 for storing stators to be wound; a sensor 41 for detecting the existence of stators accommodated in the stator storage 40; and three air cylinders 50, 51, 52 for pushing the stator to be wound into a fixture 6 (see FIG. 2). The stator position mechanism 65 comprises an optical sensor 60, a position pin 61, an encoder 62, and a servomotor 63. The stator wind mechanism 85 comprises a first frame 7 which is movable and capable of being driven to move by a stepping motor 70; a second frame 8 for accommodating the fixture 6; a wire carrying device 20 for carrying enamel wires W to be wound into a stator; a ball screw 21 which is driven to rotate by a motor 21a; a block 22 secured to the wire carrying device 20 and coupled with the ball screw 21, for guiding the movement of the wire carrying device 20; two holding devices 80, 81 for holding the enamel wires by their claws 80a, 81a (see FIGS. 8 and 9) during winding operations. The wire tension control device 30 comprises three clean pads 31, three tension adjust blocks 32, three plates 35, and three reels 39.

Figure 7:
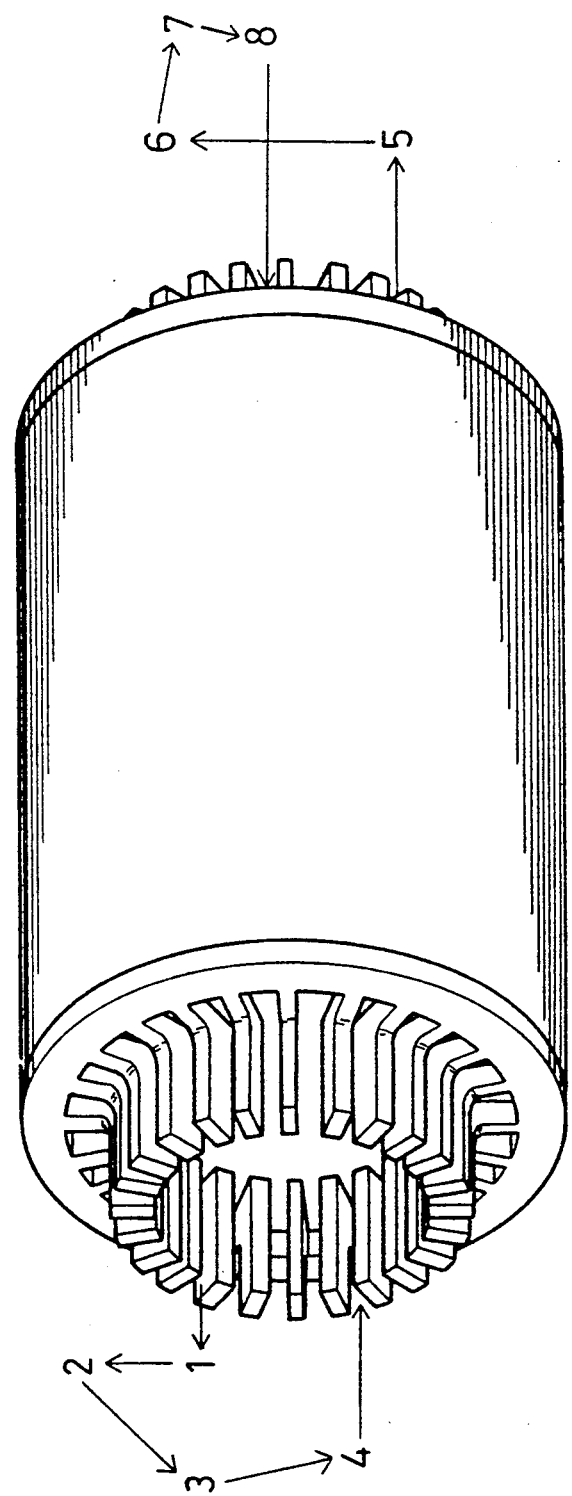
FIG. 7 is a perspective view showing a stator with two stoppers secured to its two longitudinal ends, and steps of winding operations.

When the winding apparatus shown in FIG. 3 is actuated, the sensor 41 will firstly check if there is any stator 1 shown in FIG. 7 stored in the stator storage 40. If at least one stator 1 is stored in the stator storage 40, then the stepping motor 70 will be actuated to drive the first frame 7, by means of a guiding mechanism (only belt 70a is shown in FIG. 3), to couple the first frame 7 with the stator supply mechanism 45, and the air cylinder 50 will be actuated to push out one stator 1 from the stator storage 40, and the air cylinder 52 and the air cylinder 51 will subsequently be actuated to push the stator 1 into a fixture 6 (shown in FIG. 2, which is the same as that of the 444,936 application) which is rotatably secured to the first frame 7. Then, the stepping motor 70 drives the first frame 7 to couple with the stator position mechanism 65. At the stator position mechanism 65, the optical sensor 60 detects roughly the location of one of the slots 2a of the stopper 2 shown in FIG. 7, then the servomotor 63 drives the position pin 61 to rotate a certain angle determined by the result detected by the optical sensor 60 so that the position pin 61 having position fins 61a is capable of being urged to insert into the central hole of the stator 1. When the position pin 61 is inserted into the central hole of the stator 1, its position fins 61a will engage with the slots 2a of the stopper 2 and thus urge the position pin 61 to rotate to an angular location in line with that of the stopper 2. During the inserting of the position pin 61, the encoder 62 records the total angular displacement of the position pin 61, then the position pin 61 is withdrawn and rotated to its original location. Then, the stator 1 is driven to rotate an angular displacement recorded by the encoder 62 to locate the stator 1 at its proper angular location, so that the outer coating of the enamel wires will not be damaged by the scraping of the edges of the openings of the wire slots of the stator 1.

After this, the stepping motor 70 drives the first frame 7, together with the fixture 6 which is firmly secured to the frame 7, to couple with the stator wind mechanism 85. As shown in FIG. 2, at the stator wind mechanism 85, the fixture 6 is engaged with the second frame 8, and a wire guiding member 4 is engaged with the second frame 8 for guiding, together with the claws 80a (shown in FIG. 8) of the holding device 80, the enamel wires W, which are carried by the wire carrying device 20, to be wound into the stopper 2 during winding operations. The winding operations of this invention are the same as those described in the 444,936 application, and the following is a brief description of the winding operations.

(1'). carrying the wires W engaged with the wire carrying device 20 to the extremity externally of the first stopper 2 of the stator 1;

(2'). catching and pulling the wires W with the claws 80a of the first holding device 80 (see FIG. 8) and feeding each wire W into slot 2a of the first stopper 2 under the guidance of the guiding slits of the first wire guiding member 4;

(3'). rotating the stator 1 relatively to the first wire guiding member 4 through a predetermined angle;

(4'). releasing the wires caught by the first holding device 80 at a proper position during the movement of the wire carrying device 20 toward the second stopper 3;

(5'). carrying the wires W to the extremity externally of the second stopper 3 of the stator 1;

(6'). catching and pulling the wires W with the claws 81a of the second holding device 81 (see FIG. 9) and feeding each wire W into slot of the second stopper 3 under the guidance of the guiding slits of the second wire guiding member 5;

(7'). rotating the stator 1, in a direction opposite to the rotation direction in the step (3'), through the predetermined angle so as to move the motor stator back to the original location; and (8'). carrying the wires W to the extremity externally of the first stopper 2 of the stator 1.

Repeat the steps (1') to (8') until each wire W has been wound for predetermined turns, the winding operation of the first pole of the stator 1 is thus completed. Then, rotate the stator 1 to a position suitable for the winding of the next pole of the stator 1.

Figure 5:
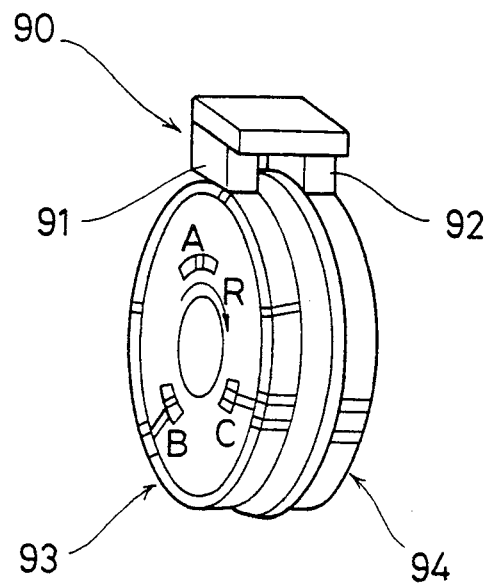
FIG. 5 is a perspective view showing the construction of a leakage current detect device.

A leakage current detect device 90 shown in FIG. 5 is secured to the fixture 6 (shown in FIG. 2) in such a way that the front disk 93 and the rear disk 94 of the leakage current detect device 90 are capable of rotating together with the fixture 6 and the stator 1. The carbon brushes 91, 92, electrically insulated with each other, are respectively kept in touch with the outer peripheral surfaces of the front disk 93 and the rear disk 94. Three terminals A, B, C are provided on the left side end surface of the front disk 93.

Figure 6:
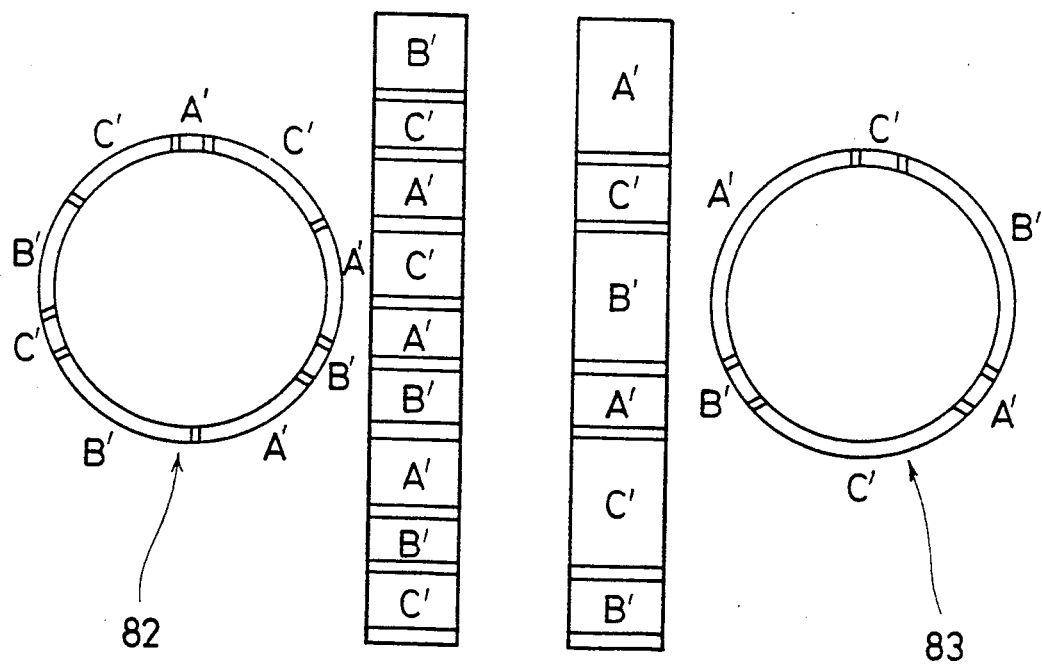
FIG. 6 is a diagram showing the disposition patterns of conductive sheets formed on the outer peripheral surfaces of two disks of the leakage current detect device shown in FIG. 5.
Figure 8:
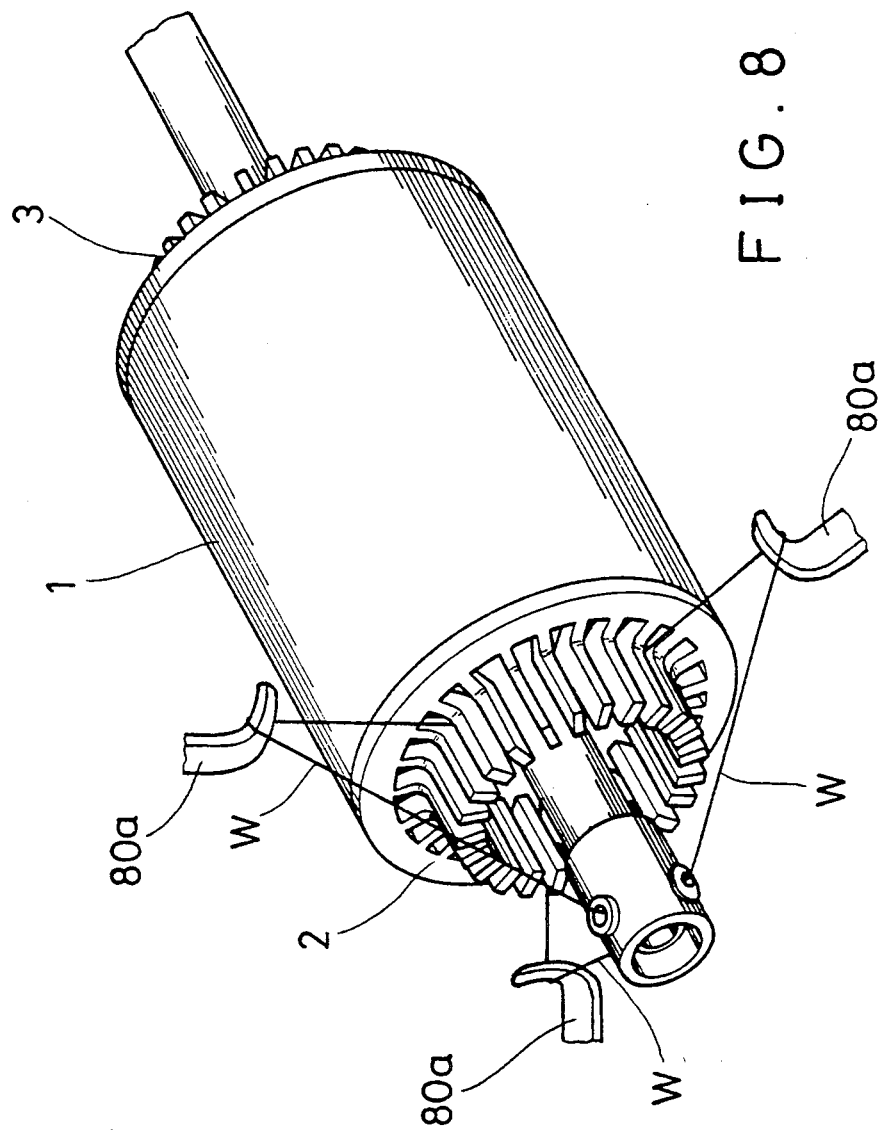
FIG. 8 is a simplified perspective view showing that a wire carrying device, penetrating through the central hole of the stator, is carrying three enamel wires to be wound on one stopper secured on one longitudinal end of the stator.
Figure 9:
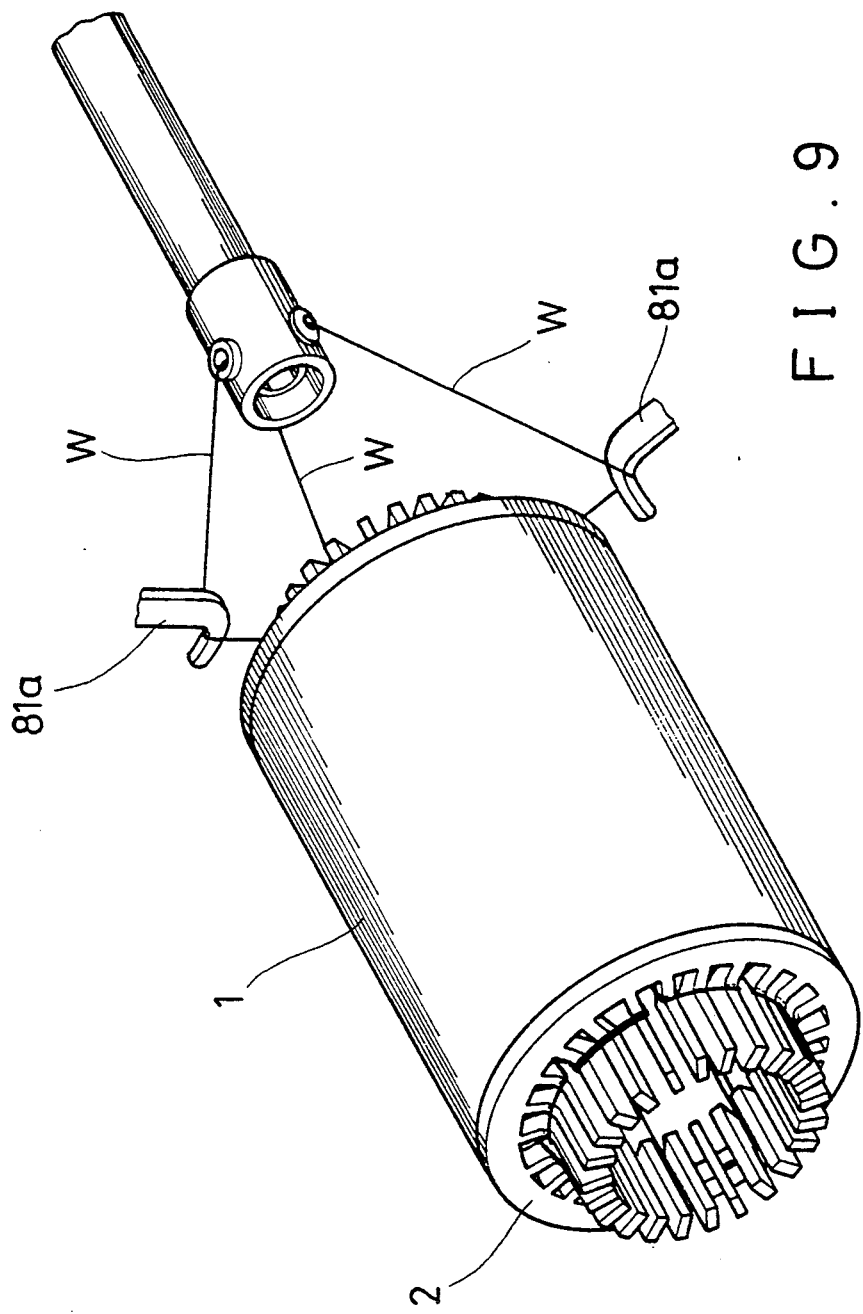
FIG. 9 is a simplified perspective view showing that a wire carrying device, drawn out from the central hole of the stator shown in FIG. 8, is carrying three enamel wires to be wound on the other stopper secured on the other longitudinal end of the stator.

FIG. 6 is a diagram showing the disposition patterns of conductive sheets A', B', C' disposed on the outer peripheral surfaces of two disks 93, 94 of the leakage current detect device 90. Each of the terminals A, B, C is respectively electrically coupled to all of its corresponding sheets A', B', C' disposed on the outer peripheral surfaces of two disks 93, 94. By this arrangement, when the stator 1 is rotated for winding, two disks 93, 94 will be rotated together with the stator 1, and each of the two carbon brushes 91, 92 kept in touch with the two disks 93, 94 will respectively couple to one of the terminals A, B, C at one time, and terminals coupled to the two brushes 91, 92 will change by turns (see FIG. 6) when the stator 1 is rotating. The ends of three enamel wires W shown in FIGS. 8 and 9 are respectively coupled to the terminals A, B, C before winding operations. If an electric voltage is applied to one of the two carbon brushes 91, 92, then an electric current will be detected from the other one when insulation among the terminals A, B, C, and the fixture 6 is destroyed, and the winding operation will be stopped to avoid further waste of the enamel wires W.

Figure 4:
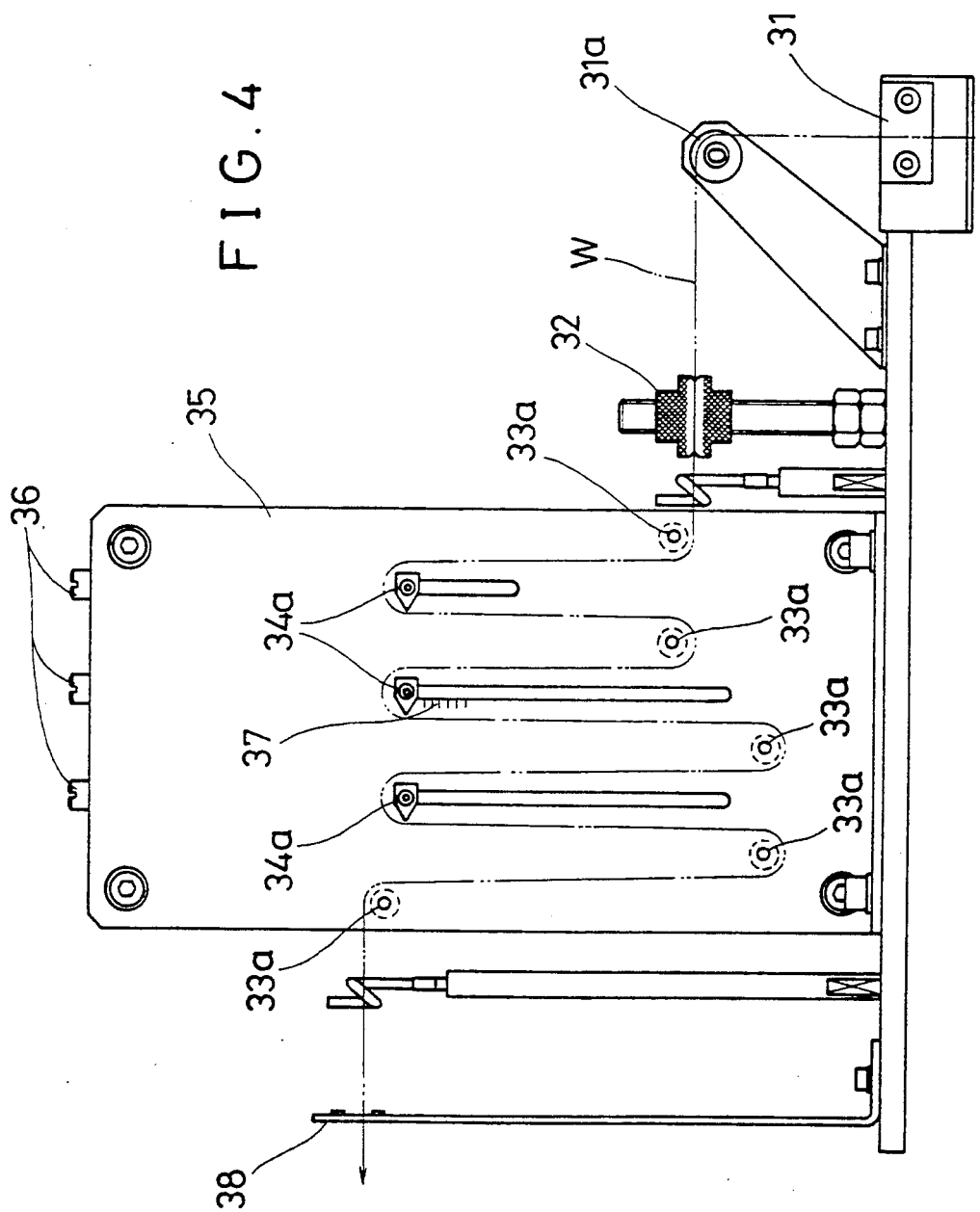
FIG. 4 is a diagram showing the construction of the main portion of the tension control device of the apparatus shown in FIG. 3.

FIG. 4 is a diagram showing the construction of the main portion of the tension control device 30 of the apparatus according to this invention. As shown in FIG. 4, the enamel wire W coming from the reel 39 (shown in FIG. 3) passes through the clean pad 31, the idle roller 31a, the tension adjust block 32, five fixed rollers 33a, and three float rollers 34a, then the enamel wire W is led to the wire carrying device 20 by way of the distribution plate 38. The float rollers 34a will move up and down during winding operations of the stator 1. The tension force of the enamel wire W can be adjusted by means of the adjust nuts 36, and the magnitude of the tension force can be read from the scale 37 provided near the middle float roller 34a. By this arrangement, the tension of enamel wires W can be more precisely adjusted. Furthermore, the enamel wires W are guided to the wire carrying device 20 by way of the through holes formed in the unmovable distribution plates 38, so that the enamel wires W will not disengage with the wire tension control device 30 during winding operations.

As described above, the winding apparatus of this invention is capable of precisely positioning the stator to be wound, so that the outer coating of enamel wires being wound into the stator will not be damaged by the scraping of the edges of the wire slots of the stator. Thus, the performance of the motor stator can be enhanced.

Furthermore, the leakage current detect device 90 will detect the damage of the enamel wires by checking the insulation among the terminals a, B, C, and the fixture. If any damage is found, the winding operations will be stopped immediately. Thus, the waste of the enamel wires and working time can be prevented.

While the invention has been described in terms of what is presently considered to be the most practical and preferred embodiments, it is to be understood that the invention need not be limited to the disclosed embodiments. On the contrary, it is intended to cover various modifications and similar arrangement included within the spirit and scope of the appended claims, the scope of which should be accorded the broadest interpretation so as to encompass all such modifications and similar structures.

What is claimed is:

1. An improved multi-phase synchronous winding apparatus for winding enamel wires into a motor stator having a central hole, a first longitudinal end, a second longitudinal end, and a plurality of wire slots which are formed in the surface of the central hole and extend between the two longitudinal ends for receiving the wires therein, said apparatus comprising a first wire stopper and a second wire stopper respectively attached to the first end and the second end of the motor stator so as to stop the wires which have been wound into the wire slots of the motor stator from sliding radially inward under the action of the wires; a stator fixture for holding the motor having said first wire stopper and said second wire stopper attached to its two longitudinal ends; first wire guiding member and second wire guiding member which cover, respectively, the first end and the second end of the motor stator, and which extend longitudinally into the central hole of the motor stator, with each of the wire guiding members including a plurality of equally-spaced guiding slits, which commence from outward of an end of the motor stator, extend longitudinally along the inner surface of the central hole of the motor stator, and radially align, respectively, with the center of one of the wire slots for accurately guiding the wires into the wire slots; rotating means for accurately rotating the stator fixture together with the motor stator, relative to the wire guiding members, through a predetermined angle as required; wire carrying means movable periodically through the central hole of the motor stator for carrying the wires to two extremities externally of the two ends of the motor stator; a plurality of pairs of first wire feeding means and second wire feeding means, with the number of pairs being the same as the phase number of the motor stator, the plurality of first wire feeding means being disposed externally of the first longitudinal end of the motor stator in a circumferentially equally spaced manner, and the plurality of second wire feeding means being disposed externally of the second longitudinal end of the motor stator in a circumferentially equally spaced manner; each of the first wire feeding means being operable to catch and pull a wire and feed the wire into a guiding slit of the first wire guiding member, and each of the second wire feeding means being operable to catch and pull a wire and feed the wire into another wire slot of the motor stator under the guidance of the guiding slits of the second wire guiding member; and a plurality of tension control means each of which properly controls the tension of a wire to be wound in the motor stator; and, said winding apparatus further comprises a stator positioning means for positioning the stator held by the stator fixture to a proper position, so that the guiding slits of the first and second wire guiding members are aligned exactly with the corresponding wire slots of the motor stator.

2. An improved multi-phase synchronous winding apparatus for a motor stator, as claimed in claim 1, wherein said stator positioning means comprises;

an optical sensor for detecting the angular locations of the wire slots of the stators to be wound; and means for recording the result detected by said optical sensor and urging the stator to be wound to rotate to a proper angular location according to the result detected by said optical sensor.

3. An improved multi-phase synchronous winding apparatus for winding enamel wires into a motor stator having a central hole, a first longitudinal end, a second longitudinal end, and a plurality of wire slots which are formed in the surface of the central hole and extend between the two longitudinal ends for receiving the wires therein, said apparatus comprising a first wire stopper and a second wire stopper respectively attached to the first end and the second end of the motor stator so as to stop the wires which have been wound into the wire slots of the motor stator from sliding radially inward under the action of the wires; a stator fixture for holding the motor having said first wire stopper and said second wire stopper attached to its two longitudinal ends; first wire guiding member and second wire guiding member which cover, respectively, the first end and the second end of the motor stator, and which extend longitudinally into the central hole of the motor stator, with each of the wire guiding members including a plurality of equally-spaced guiding slits, which commence from outward of an end of the motor stator, extend longitudinally along the inner surface of the central hole of the motor stator, and radially align, respectively, with the center of one of the wire slots for accurately guiding the wires into the wire slots; rotating means for accurately rotating the stator fixture together with the motor stator, relative to the wire guiding members, through a predetermined angle as required; wire carry means movable periodically through the central hole of the motor stator for carrying the wires to two extremities externally of the two ends of the motor stator; a plurality of pairs of first wire feeding means and second wire feeding means, with the number of pairs being the same as the phase number of the motor stator, the plurality of first wire feeding means being disposed externally of the first longitudinal end of the motor stator in a circumferentially equally spaced manner, and the plurality of second wire feeding means being disposed externally of the second longitudinal end of the motor stator in a circumferentially equally spaced manner; each of the first wire feeding means being operable to catch and pull a wire and feed the wire into a guiding slit of the first wire guiding member, and each of the second wire feeding means being operable to catch and pull a wire and feed the wire into another wire slot of the motor stator under the guidance of the guiding slits of the second wire guiding member; and a plurality of tension control means each of which properly control the tension of a wire to be wound in he motor stator; and said winding apparatus further comprises means for detecting damage of insulation among wires and the stator fixture during winding operations.

4. An improved multi-phase synchronous winding apparatus for a motor stator, as claimed in claim 3, wherein said detecting means comprises:

a sensor for detecting the existence of an electric current;

a high-voltage electric power source;

one pair of spaced disks secured to the stator fixture, for rotating together therewith;

a plurality of terminals secured to one of said disks, with the number of the terminals being the same as the phase number of the motor stator, for connecting with the wires to be wound into the wire slots of the motor stator;

a plurality of sets of first electric conducts, with the number of the sets of said first electric conducts being the same as the phase number of the motor stator, disposed on the outer peripheral surfaces of said pair of spaced disks, each set of said first electric conducts being electrically connected to one of said terminals; and one pair of second electric conducts electrically insulated with each other, each of which being respectively and alternately kept in touch with one of said first electric conducts at one time when said pair of spaced disks are being rotated, one of said second electric conducts being coupled to said high-voltage electric power source, the other being coupled to said sensor.

5. An improved multi-phase synchronous winding apparatus for winding enamel wires into a motor stator having a central hole, a first longitudinal end, a second longitudinal end, and a plurality of wire slots which are formed in the surface of the central hole and extend between the two longitudinal ends for receiving the wires therein, said apparatus comprising a first wire stopper and a second wire stopper respectively attached to the first end and the second end of the motor stator so as to stop the wires which have been wound into the wire slots of the motor stator from sliding radially inward under the action of the wires; a stator fixture for holding the motor having said first wire stopper and said second wire stopper attached to its two longitudinal ends; first wire guiding member and second wire guiding member which cover, respectively, the first end and the second end of the motor stator, and which extend longitudinally into the central hole of the motor stator, with each of the wire guiding members including a plurality of equally-spaced guiding slits, which commence from outward of an end of the motor stator, extend longitudinally along the inner surface of the central hole of the motor stator, and radially align, respectively, with the center of one of the wire slots for accurately guiding the wires into the wire slots; rotating means for accurately rotating the stator fixture together with the motor stator, relative to the wire guiding members, through a predetermined angle as required; wire carry means movable periodically through the central hole of the motor stator for carrying the wires to two extremities externally of the two ends of the motor stator; a plurality of pairs of first wire feeding means and second wire feeding means, with the number of pairs being the same as the phase number of the motor stator, the plurality of first wire feeding means being disposed externally of the first longitudinal end of the motor stator in a circumferentially equally spaced manner, and the plurality of second wire feeding means being disposed externally of the second longitudinal end of the motor stator in a circumferentially equally spaced manner; each of the first wire feeding means being operable to catch and pull a wire and feed the wire into a guiding slit of the first wire guiding member, and each of the second wire feeding means being operable to catch and pull a wire and feed the wire into another wire slot of the motor stator under the guidance of the guiding slits of the second wire guiding member; and a plurality of tension control means each of which being adapted to properly control the tension of a wire to be wound in the motor stator; and each of said tension control means comprises means for adjusting the tension of the wire passing therethrough; and means for guiding the wire passing therethrough to come out from said tension control means by way of an unmovable outlet.

6. A method for winding enamel wires into a multiphase motor stator having a central hole, a first longitudinal end, a second longitudinal end, and a plurality of wire slots which are formed in the surface of the central hole and extend between the two longitudinal ends for receiving the wires therein, said method comprising:

(I) attaching a first wire stopper and a second wire stopper, respectively, to the first longitudinal end and the second longitudinal end of the motor stator;

(II) holding the motor stator with a stator fixture which may be operated to precisely rotate the motor stator through a predetermined angle as required;

(III) positioning the stator held by the stator fixture to a proper angular position, and covering the first end and the second end of the motor stator, respectively, with a first wire guiding member and a second wire guiding member, each of the wire guiding members including a plurality of equally-spaced guiding slits which commence from outward of a longitudinal end of the motor stator, extending longitudinally along the inner surface of the central hole of the motor stator, and radially align, respectively, with the center of one of the wire slots for accurately guiding the wires into the wire slots, whereby the guiding slits of the first and second wire guiding members are capable of aligning exactly with the corresponding wire slots of the motor stator;

(IV) mounting a plurality of wires, the same in number as that of the motor stator, into a wire carrying means capable of moving periodically through the central hole of the motor stator for carrying the wires to two extremities externally of the two ends of the motor stator, and fixing the end portion of each wire to the stator fixture;

(V) carrying the plurality of wires to the extremity externally of the first longitudinal end of the motor with the wire carrying means;

(VI) catching and pulling each of the wires with one of a plurality of first wire feeding means and feeding each wire into a first wire slot of the motor stator under the guidance of the guiding slits of the first wire guiding member;

(VII) rotating the motor stator relative to the wire guiding members through a predetermined angle so as to move a second wire slot of the motor stator, which is of the same pole as the first wire slot of the motor stator, into the original location of the first wire slot, whereby winding a length of each wire onto the first wire stopper covering an angular range of said predetermined angle and stopping the wound wires from moving inward with the first wire stopper;

(VIII) carrying each wire outward of the second end of the motor stator with the wire carrying means and releasing the wires caught by the first wire feeding means at a proper position during the movement of the carrying means toward the second end of the motor stator under the guiding member;

(IX) catching and pulling each wire with one of a plurality of second wire feeding means and feeding the wire into the second wire slot of the motor stator under the guidance of the guiding slits of the second wire guiding member;

(X) rotating the motor stator, in a direction opposite to the rotation direction of the motor stator in the step (VII), through the predetermined angle so as to move the motor stator back to the original location thereof in step (VI) whereby winding a length of each wire onto the second wire stopper covering an angular range of the predetermined angle and stopping the wound wires from moving inward with the second wire stopper;

(XI) carrying each the wires to the extremity externally of the first end of the motor stator with the wire carrying means and releasing the wires caught by the second wire feeding means at a proper position during the movement of the wire carrying means toward the first end of the motor stator;

(XII) repeating the steps (VI) to (XI) until each wire has been wound in the first and second wire slots for predetermined turns so as to complete the winding operation of the first pole of the motor stator;

(XIII) rotating the motor stator to a position suitable for the winding operation of the next pole or the motor stator, and performing the winding operation according to said steps (VI) to (XII); and (XIV) repeating the step (XIII) until all of the poles of the motor stator have finished winding operation; and positioning the stator held by the stator fixture to a proper position, so that the guiding slits of the first and second wire guiding members are aligning exactly with the corresponding wire slots of the motor stator.

7. A method for winding enamel wires into a multiphase motor stator having a central hole, a first longitudinal end, a second longitudinal end, and a plurality of wire slots which are formed in the surface of the central hole and extend between the two longitudinal ends for receiving the wires therein, said method comprising:

(I) attaching a first wire stopper and a second wire stopper, respectively, to the first longitudinal end and the second longitudinal end of the motor stator;

(II) holding the motor stator with a stator fixture which may be operated to precisely rotate the motor stator through a predetermined angle as required;

(III) covering the first end and the second end of the motor stator, respectively, with a first wire guiding member and a second wire guiding member, each of the wire guiding members including a plurality of equally-spaced guiding slits which commence from outward of a longitudinal end of the motor stator, extending longitudinally along the inner surface of the central hole of the motor stator, and radially align, respectively, with the center of one of the wire slots for accurately guiding the wires into the wire slots;

(VI) mounting a plurality of wires, the same in number as that of the motor stator, into a wire carrying means capable of moving periodically through the central hole of the motor stator for carrying the wires to two extremities externally of the two ends of the motor stator, and fixing the end portion of each wire to the stator fixture;

(V) carrying the plurality of wires to the extremity externally of the first longitudinal end of the motor with the wire carrying means;

(VI) catching and pulling each of the wires with one of a plurality of first wire feeding means and feeding each wire into a first wire slot of the motor stator under the guidance of the guiding slits of the first wire guiding member;

(VII) rotating the motor stator relative to the wire guiding members through a predetermined angle so as to move a second wire slot of the motor stator, which is of the same pole as the first wire slot of the motor stator, into the original location of the first wire slot, whereby winding a length of each wire onto the first wire stopper covering an angular range of said predetermined angle and stopping the wound wires from moving inward with the first wire stopper;

(VIII) carrying each wire outward of the second end of the motor stator with the wire carrying means and releasing the wires caught by the first wire feeding means at a proper position during the movement of the carrying means toward the second end of the motor stator under the guiding member;

(IX) catching and pulling each wire with one of a plurality of second wire feeding means and feeding the wire into the second wire slot of the motor stator under the guidance of the guiding slits of the second wire guiding member;

(X) rotating the motor stator, in a direction opposite to the rotation direction of the motor stator in the step (VII), through the predetermined angle so as to move the motor stator back to the original location thereof in step (VI) whereby winding a length of each wire onto the second wire stopper covering an angular range of the predetermined angle and stopping the wound wires from moving inward with the second wire stopper;

(XI) carrying each the wires to the extremity externally of the first end of the motor stator with the wire carrying means and releasing the wires caught by the second wire feeding means at a proper position during the movement of the wire carrying means toward the first end of the motor stator;

(XII) repeating the steps (VI) to (XI) until each wire has been wound in the first and second wire slots for predetermined turns so as to complete the winding operation of the first pole of the motor stator;

(XIII) rotating the motor stator to a position suitable for the winding operation of the next of the motor stator, and performing the winding operation according to said steps (VI) to (XII);

(XIV) repeating the step (XIII) until all of the poles of the motor stator have finished winding operation; and (XV) detecting damage of the insulation among wires and the stator fixture during winding operations by a device having a sensor for detecting the existence of an electric current; an electric power source; one pair of spaced disks secured to the stator fixture, for rotating together therewith; a plurality of terminals secured to the same as the phase number of the motor stator, for connecting with the wires to be wound into the wire slots of the motor stator; a plurality of sets of first electric conducts, with the number of the sets of said first electric conducts being the same as the phase number of the motor stator, disposed on the outer peripheral surfaces of said pair of spaced disks, each set of said first electric conducts being electrically connected to one of said terminals; and one pair of second electric conducts electrically insulated with each other, each of which being respectively and alternately kept in touch with one of said first electric conducts at one time when said pair of spaced disks are being rotated, one of said second electric conducts being coupled to said electric power source, the other being coupled to said sensor.

8. A method for winding enamel wires into a multi-phase motor stator having a central hole, a first longitudinal end, a second longitudinal end, and a plurality of wire slots which are formed in the surface of the central hole and extend between the two longitudinal ends for receiving the wires therein, said method comprising:

(I) attaching a first wire stopper and a second wire stopper, respectively, to the first longitudinal end and the second longitudinal end of the motor stator;

(II) holding the motor stator with a stator fixture which may be operated to precisely rotate the motor stator through a predetermined angle as required;

(III) covering the first end and the second end of the motor stator, respectively, with a first wire guiding member and a second wire guiding member, each of the wire guiding members including a plurality of equally-spaced guiding slits which commence from outward of a longitudinal end of the motor stator, extending longitudinally along the inner surface of the central hole of the motor stator, and radially align, respectively, with the center of one of the wire slots for accurately guiding the wires into the wire slots;

(IV) mounting a plurality of wires, the same in number as that of the motor stator, into a wire carrying means capable of moving periodically through the central hole of the motor stator for carrying the wires to two extremities externally of the two ends of the motor stator, and fixing the end portion of each wire to the stator fixture;

(V) carrying the plurality of wires to the extremity externally of the first longitudinal end of the motor with the wire carrying means;

(VI) catching and pulling each of the wires with one of a plurality of first wire feeding means and feeding each wire into a first wire slot of the motor stator under the guidance of the guiding slits of the first wire guiding member;

(VII) rotating the motor stator relative to the wire guiding members through a predetermined angle so as to move a second wire slot of the motor stator, which is of the same pole as the first wire slot of the motor stator, into the original location of the first wire slot, whereby winding a length of each wire onto the first wire stopper covering an angular range of said predetermined angle and stopping the wound wires from moving inward with the first wire stopper;

(VIII) carrying each wire outward of the second end of the motor stator with the wire carrying means and releasing the wires caught by the first wire feeding means at a proper position during the movement of the carrying means toward the second end of the motor stator under the guiding member;

(IX) catching and pulling each wire with one of a plurality of second wire feeding means and feeding the wire into the second wire slot of the motor stator under the guidance of the guiding slits of the second wire guiding member;

(X) rotating the motor stator, in a direction opposite to the rotation direction of the motor stator in the step (VII), through the predetermined angle so as to move the motor stator back to the original location thereof in step VI whereby winding a length of each wire onto the second wire stopper covering an angular range of the predetermined angle and stopping the wound wires from moving inward with the second wire stopper;

(XI) carrying each of the wires to the extremity externally of the first end of the motor stator with the wire carrying means and releasing the wires caught by the second wire feeding means at a proper position during the movement of the wire carrying means toward the first end of the motor stator;

(XII) repeating the steps (VI) to (XI) until each wire has been wound in the first and second wire slots for predetermined turns so as to complete the winding operation of the first pole of the motor stator;

(XIII) rotating the motor stator to a position suitable for the winding operation of the next pole of the motor stator, and performing the winding operation according to said steps (VI) to (XII);

(XIV) repeating the step (XII) until all of the poles of the motor stator have finished winding operation; and adjusting the tension of the wires and guiding the wires by way of unmovable guide members.

* * * * *